April 20, 1965   J. W. G. WALTERS   3,179,453
TYING APPARATUS
Filed Aug. 26, 1963   13 Sheets-Sheet 1

Inventor:
John Walter Gray Walters
BY Baldwin & Wight
Attorneys

April 20, 1965

J. W. G. WALTERS 3,179,453

TYING APPARATUS

Filed Aug. 26, 1963

Inventor:
John Walter Gray Walter
BY Baldwin & Wight
Attorneys

April 20, 1965 J. W. G. WALTERS 3,179,453
TYING APPARATUS
Filed Aug. 26, 1963 13 Sheets-Sheet 5

Inventor:
John Walter Gray Walters
By Baldwin & Wight
Attorneys

April 20, 1965     J. W. G. WALTERS     3,179,453
TYING APPARATUS
Filed Aug. 26, 1963     13 Sheets-Sheet 7

Inventor:
John Walter Gray Walters
By Baldwin & Wight
Attorneys

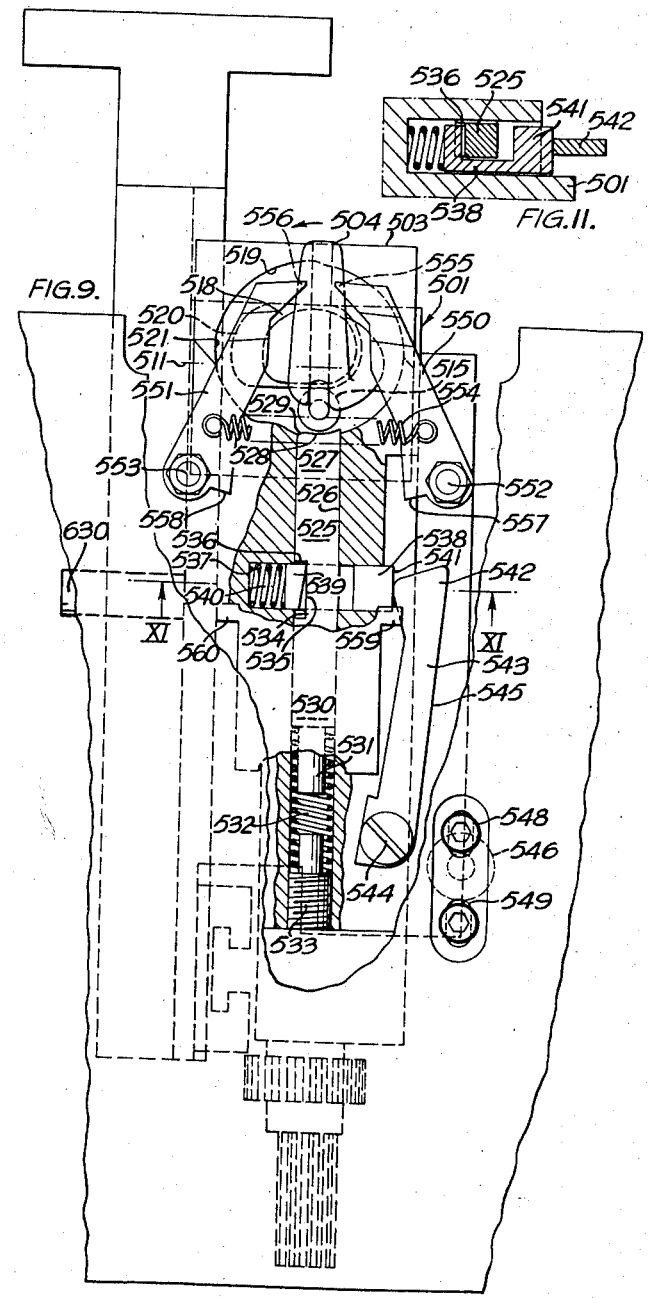

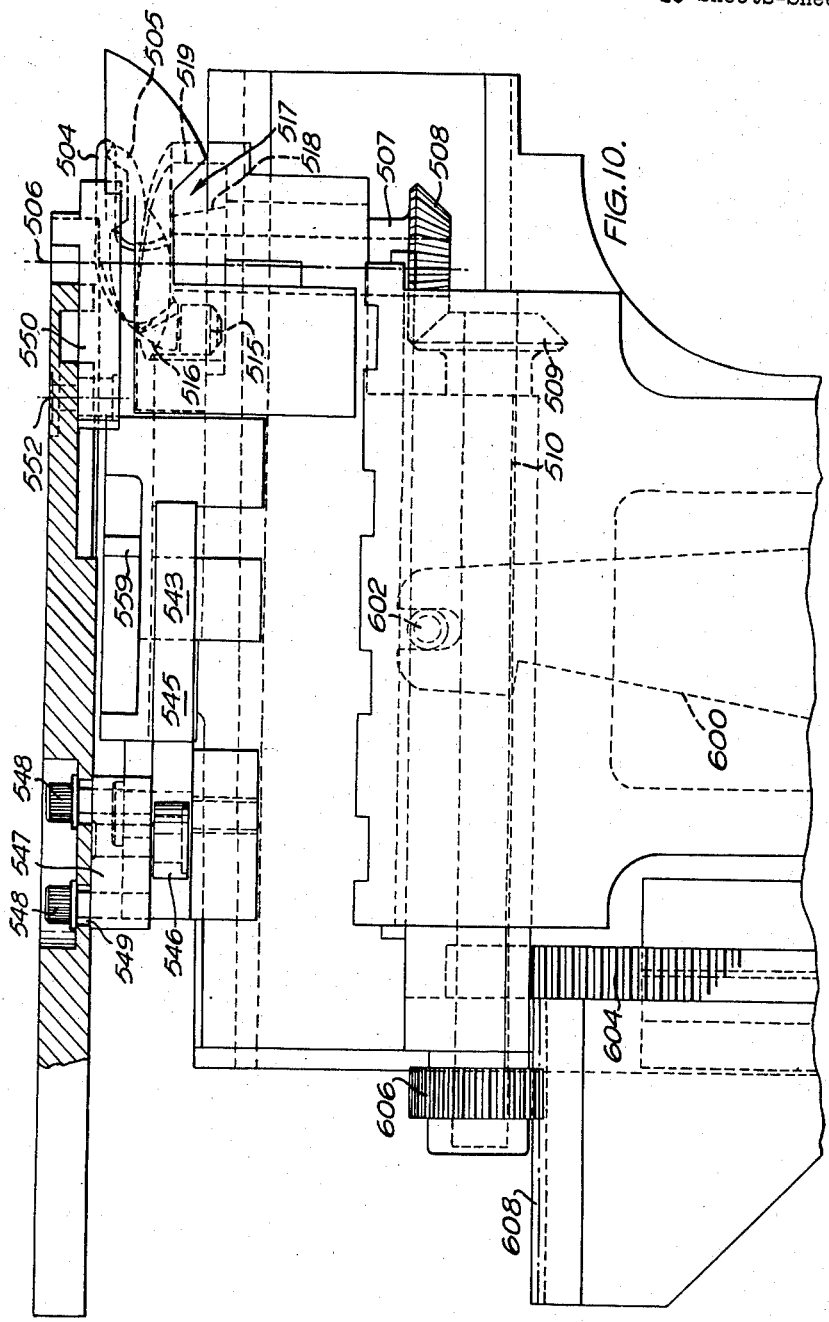

3,179,453
TYING APPARATUS
John Walter Gray Walters, Crowborough, Sussex, England, assignor to Sheridan Service Company Limited, London, England, a company of the United Kingdom
Filed Aug. 26, 1963, Ser. No. 304,425
Claims priority, application Great Britain, Aug. 27, 1962,
32,810/62
9 Claims. (Cl. 289—18)

This invention relates to tying apparatus capable of tying with twine, e.g., sisal, a bundle around its length and around its width.

Bundle tying apparatus is known which ties a bundle once in the plane of one of its dimensions. Proposals have been made for tying a bundle twice, the two ties lying at right angles to each other, so as to extend one around the length and the other around the width of the bundle. In the known apparatus for performing this double tying operation it is necessary for the bundle to be turned through 90° or to move the bundle along a right angled path of movement. The reason for this being that in the known apparatus, the two means employed to wrap the twine around the bundle both operate in parallel planes. Hence, it is necessary to turn the bundle so that it can be tied around its length and then around its width.

The present invention seeks to provide apparatus for tying a bundle in its longitudinal direction and its transverse direction without the need to turn the bundle.

According to the present invention, tying apparatus comprises a straight line conveyor adapted to move a bundle to be tied to and through a first tying station and then to and through a second tying station, tying mechanism at each station adapted to wrap and knot a length of twine around the bundle, one tying mechanism tying the bundle in a transverse direction and the other tying the bundle in a longitudinal direction, and means to control the feed of the bundle by the conveyor, whereby the bundle is maintained stationary at each station whilst a tying operation is being performed.

The tying mechanism at one tying station may include twine carrying means movable in an orbit in a plane normal to the path of movement of the bundle by the conveyor and the tying mechanism at the other tying station may include twine carrying means movable in an orbit in a plane parallel to the path of movement of the bundle by the conveyor.

Each tying mechanism may include a rotatable annulus, twine retaining means fast with the annulus and adapted to hold a free end of a length of twine, whereby upon rotation of the annulus, the twine retaining means encircles the bundle drawing a length of twine from a supply and wrapping said length around the bundle. At the first tying station the annulus may lie in a plane normal to the path of movement of a bundle by the conveyor, a bundle when at said first tying station lying within the annulus. At the second tying station the annulus may lie in a plane parallel to and at one side of the path of movement of the bundle by the conveyor, said annulus having an outrigger arm lying parallel to its axis of rotation and carrying the twine retaining means.

A movable abutment may be provided at each tying station, said abutment being movable between an operative position to arrest a bundle at the station and an inoperative position to allow free passage of the bundle from the station.

A knotter mechanism may be provided at each station located below the path of movement of the bundle.

Preferably, the conveyor comprises a plurality of rollers adapted to support a bundle to be tied and rotatable to move the bundle into the first tying station, onto the second tying station and out of said second tying station.

Preferably, means are provided adapted to control movement of the abutment at the first tying station into its operative position, rotation of the roller conveyor, whereby a bundle is moved into the first station, stopping the roller conveyor when the bundle is in position in the first tying station, rotation for one revolution of the annulus at said station, actuation of the knotter mechanism of said first station to tie the twine wrapped around the bundle and to sever it from the twine leading back to the supply, movement of the abutment at the first tying station to its inoperative position when the first tying operation has been completed, actuation of the roller conveyor whereby the bundle is moved from the first to the second tying station, movement of the abutment at the second tying station into its operative position, stopping the roller conveyor when the bundle reaches the second tying station, rotation of the annulus at said second tying station for one revolution, actuation of the knotter mechanism at the second station when the annulus thereof has completed its revolution whereby the twine wrapped around the bundle is knotted and severed from the twine leading back to the supply, movement of the abutment at the second tying station to its inoperative position and rotation of the roller conveyor whereby the tied bundle is moved out of said second tying station.

An embodiment of tying apparatus according to the present invention is now described with reference to the accompanying drawing in which—

Figure 3:
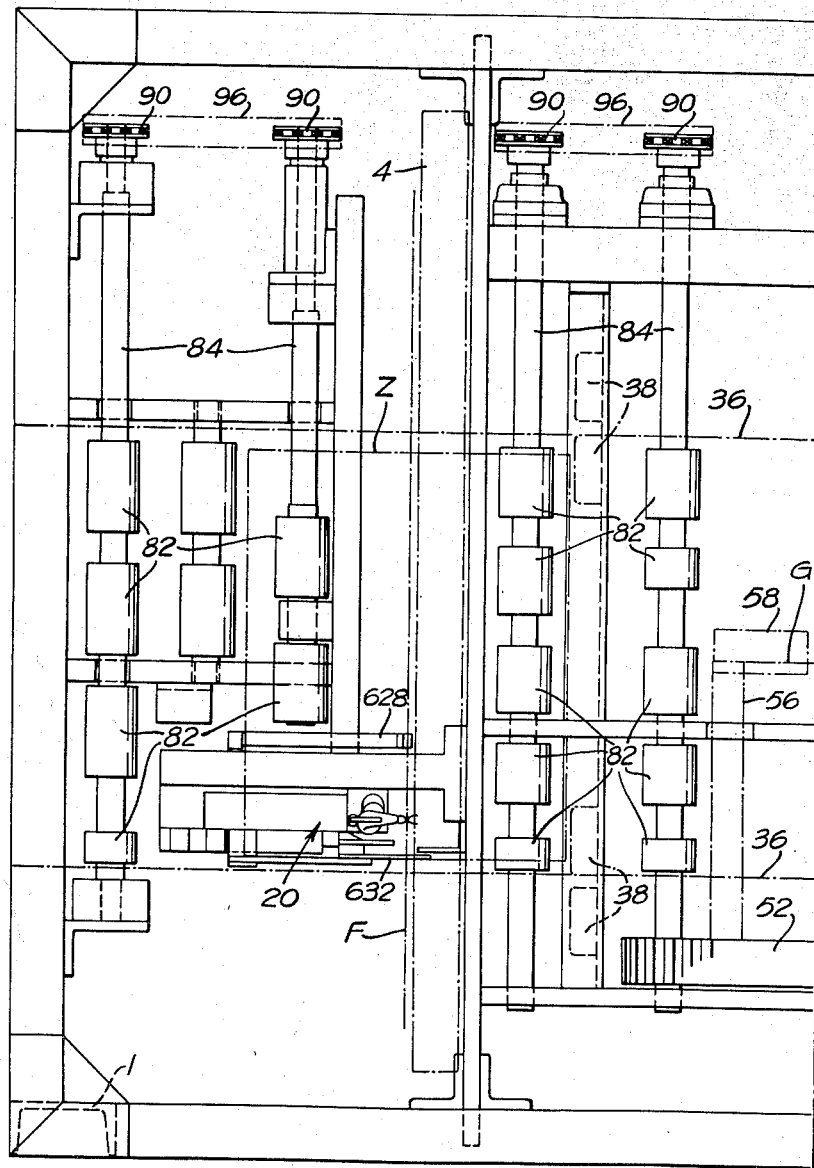
Figure 3:
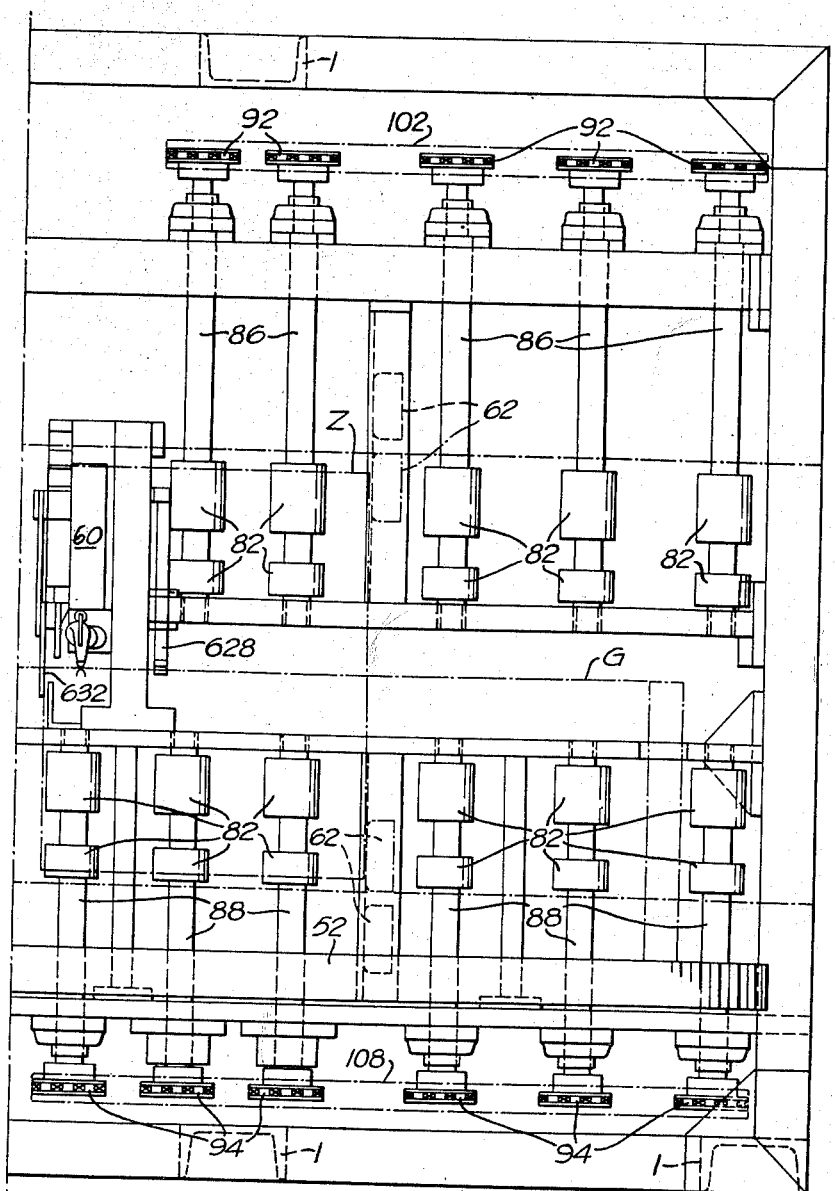

FIGURES 3(a) and 3(b) are, respectively, plan views of different portions of the roller conveyor. These two views are to be considered together, as though joined along the dot-dash line at the right of FIGURE 3(a) and at the left of FIGURE 3(b).

Figure 4:
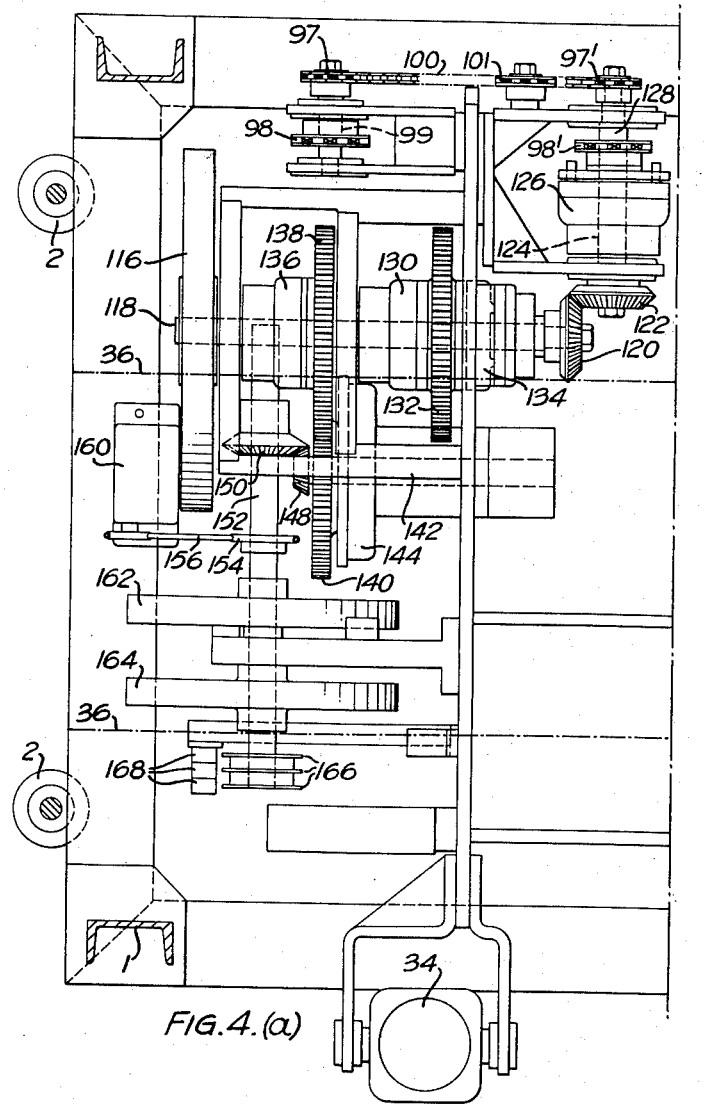
Figure 4:
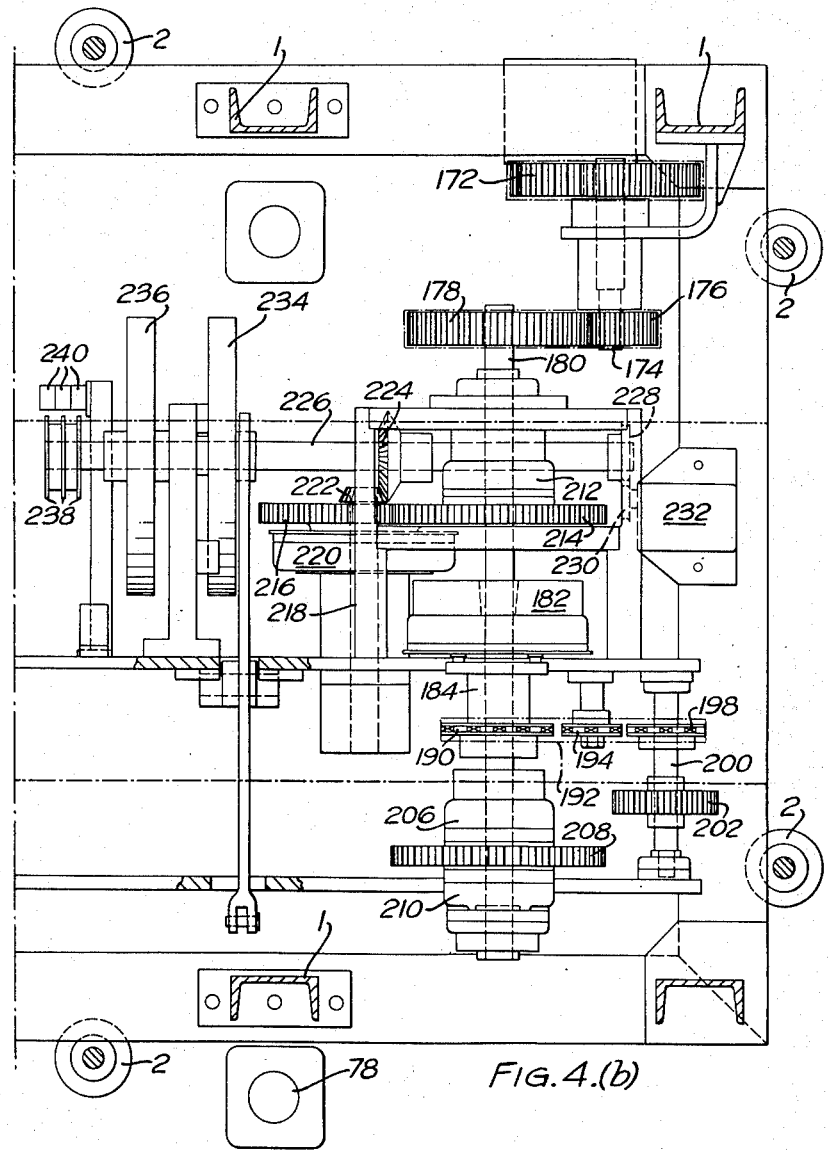

FIGURES 4(a) and 4(b) are plan views, below the roller conveyor, of different portions of the mechanism driving apparatus. These two views are to be considered together, as though joined along the dot-dash line at the right of FIGURE 4(a) and at the left of FIGURE 4(b).

Figure 5:
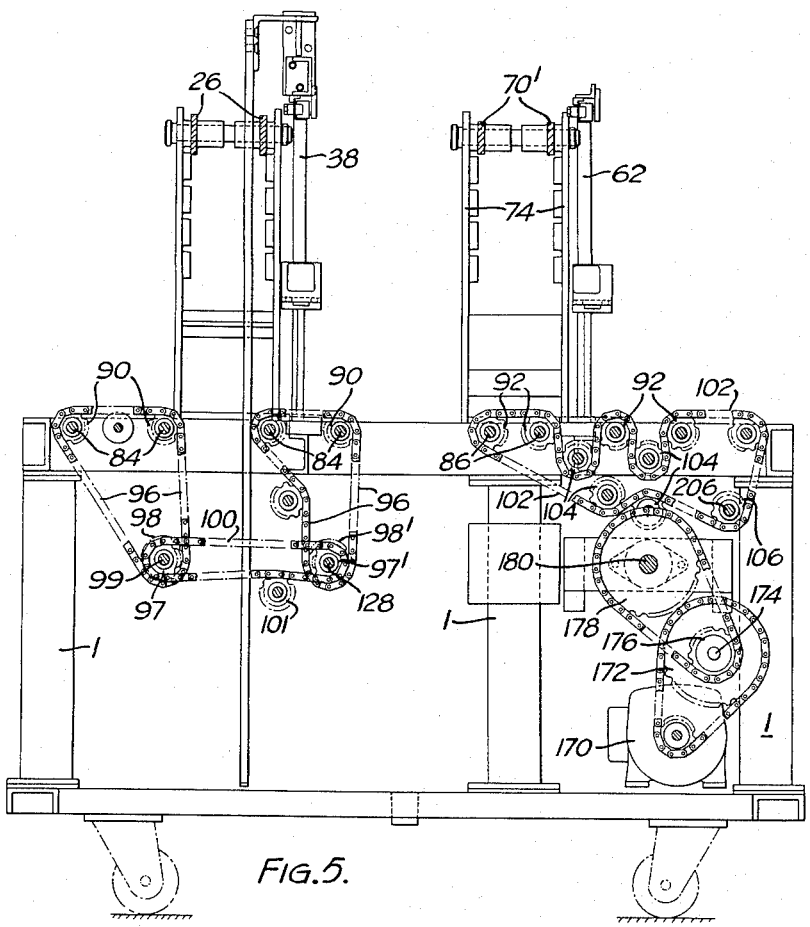

FIGURE 5 is an elevation in a vertical plane along one side of the apparatus showing the drive leading up to certain of the roller conveyors.

Figure 6:
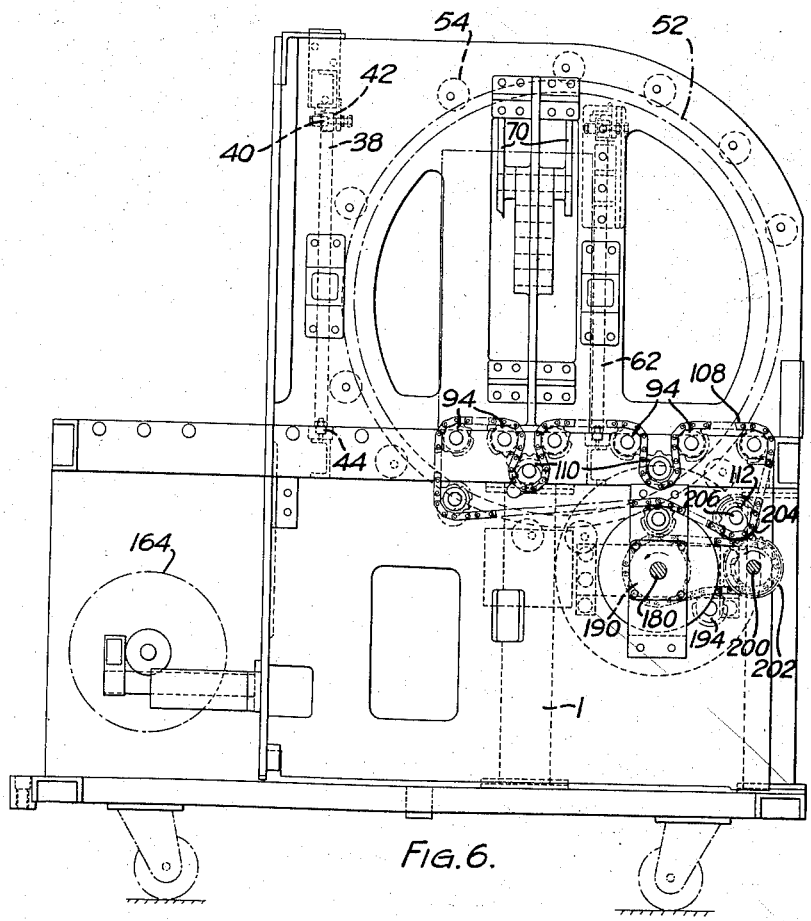

FIGURE 6 is an elevation in a vertical plane on the opposite side of the apparatus showing the drive to other rollers of the conveyor.

Figure 7:
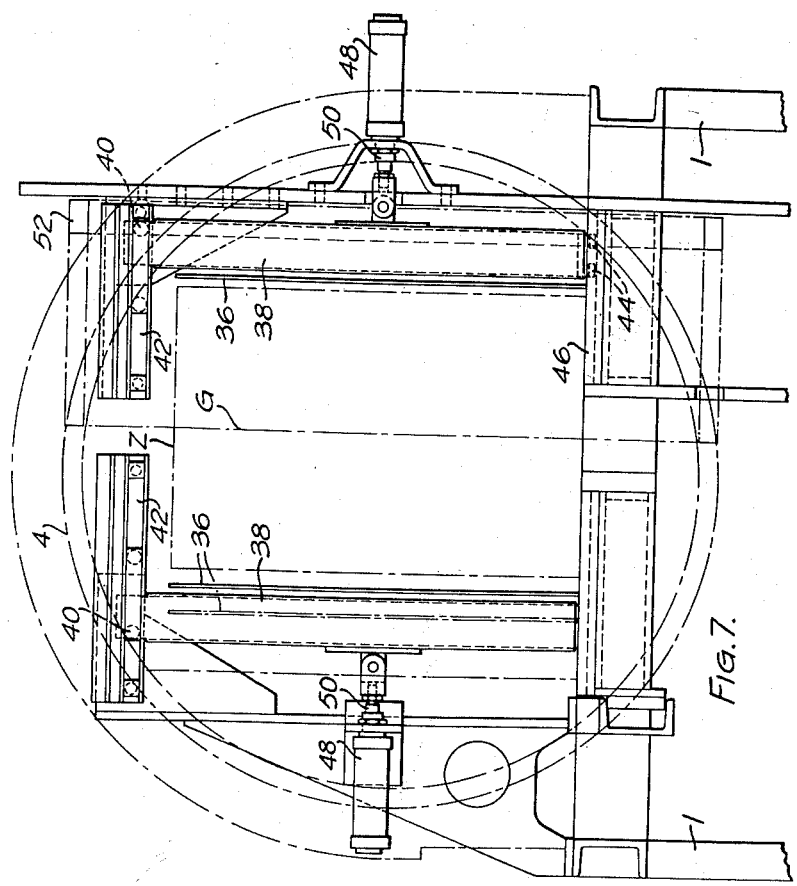

FIGURE 7 is an elevation in a transverse vertical plane of the apparatus immediately in front of the first tying station.

Figure 8:
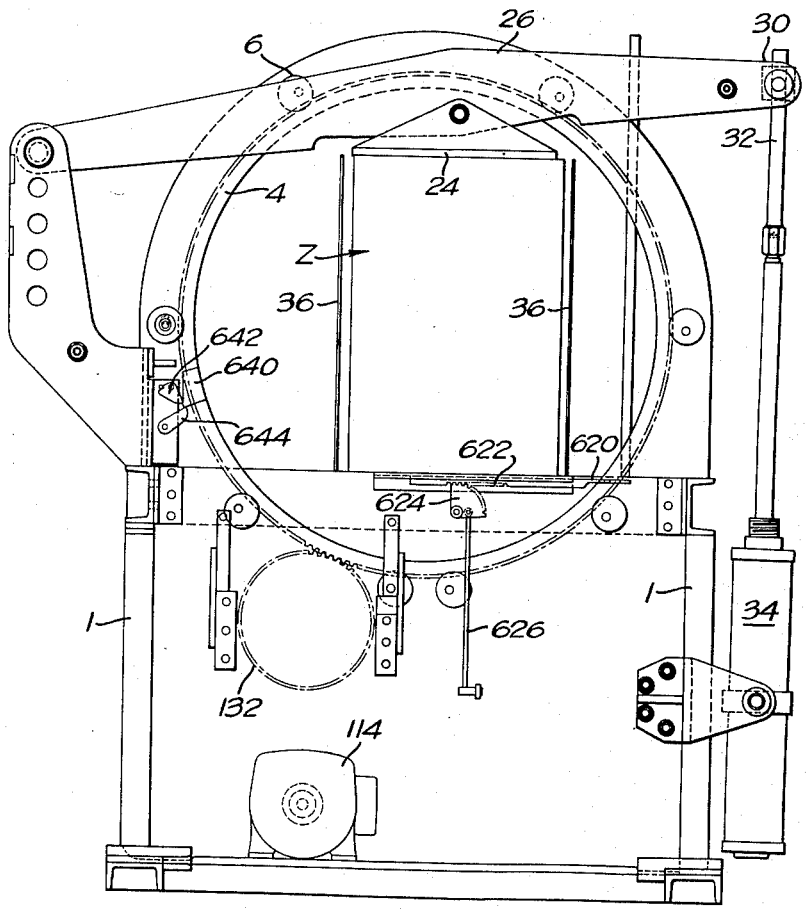

FIGURE 8 is an elevation in a transverse vertical plane slightly behind that of FIGURE 7 but in front of the first tying station.

FIGURE 9 shows a plan view and on an enlarged scale the knotter mechanism.

FIGURE 10 shows a side elevation of a knotter mechanism.

FIGURE 11 shows small detail of said mechanism, and

Figure 12:
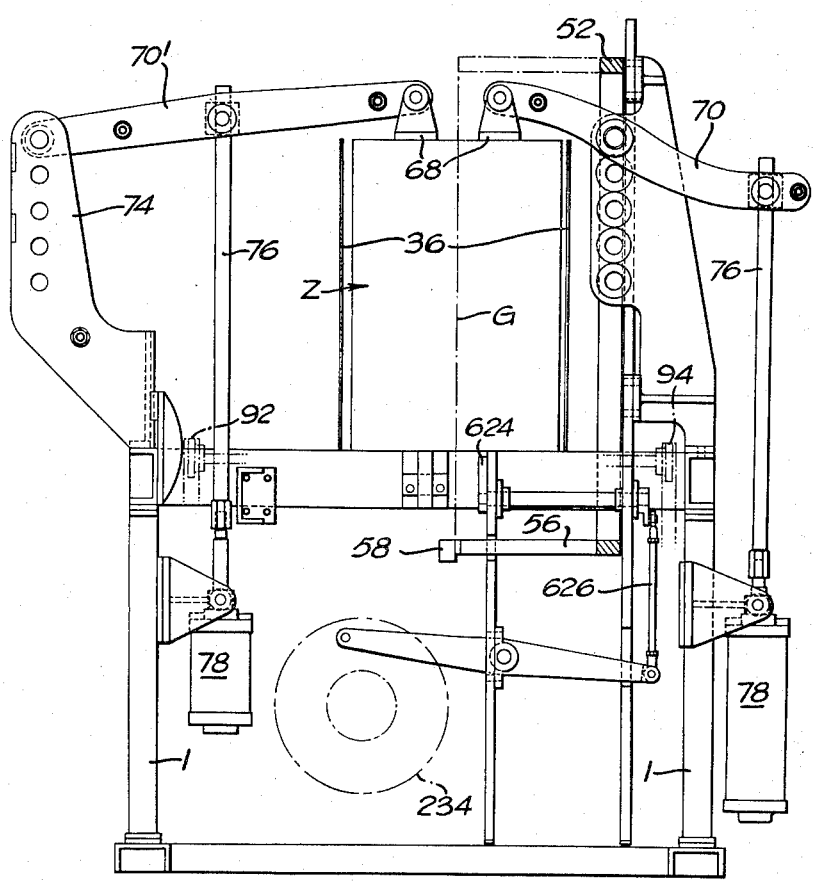

FIGURE 12 is a transverse section in front of the 2nd station.

Figure 1:
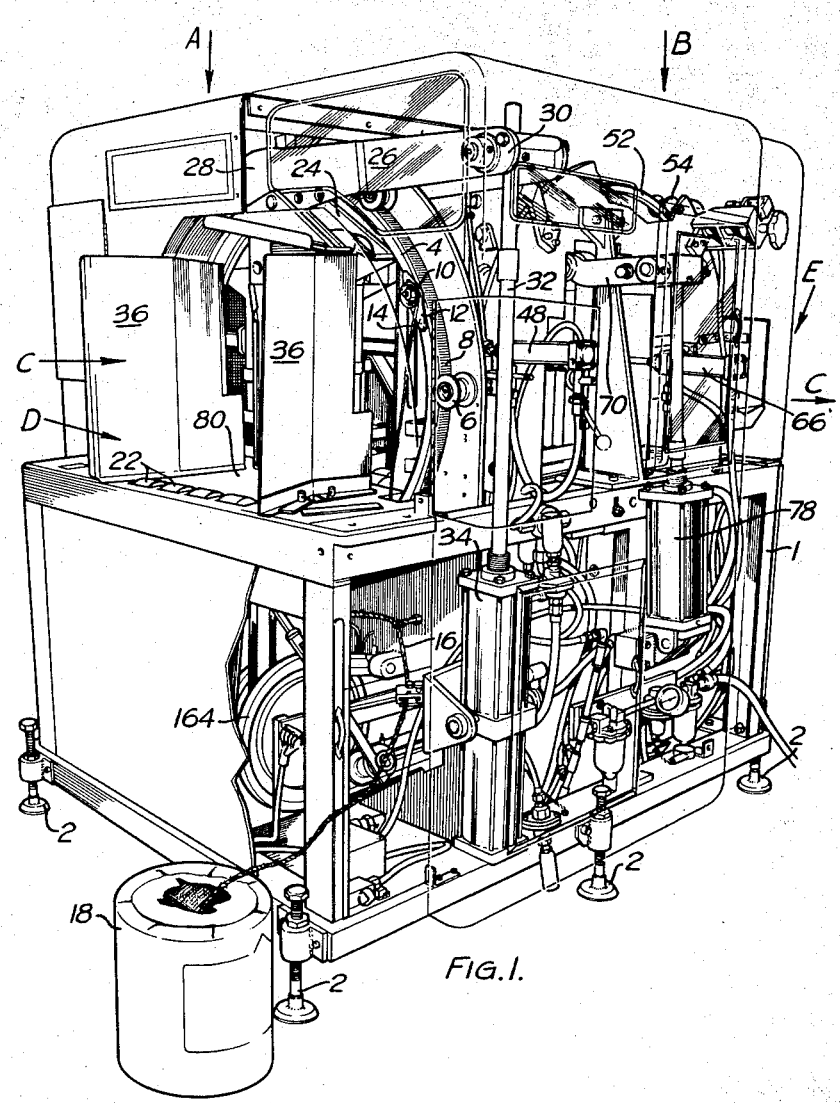
FIGURE 1 is a perspective view of the tying apparatus with the outer casing broken away.

Referring to FIGURE 1, the tying apparatus has two tying stations A and B. A bundle moves through the apparatus in a straight line path of movement in the direction indicated by the arrows C entering at an inlet D and leaving from an exit E.

At the first tying station a tie is made around the bundle as indicated at F (see FIGURE 2), the said tie F lying in a transverse plane of the bundle which is indicated at Z. At the second tying station a tie G is applied which lies in a longitudinal plane of the bundle. As will be appreciated from examination of FIGURE 2, a transverse plane is one lying normal to the direction of movement of the bundle through the apparatus and a longitudinal plane is one lying parallel to said direction of movement.

Figure 2:
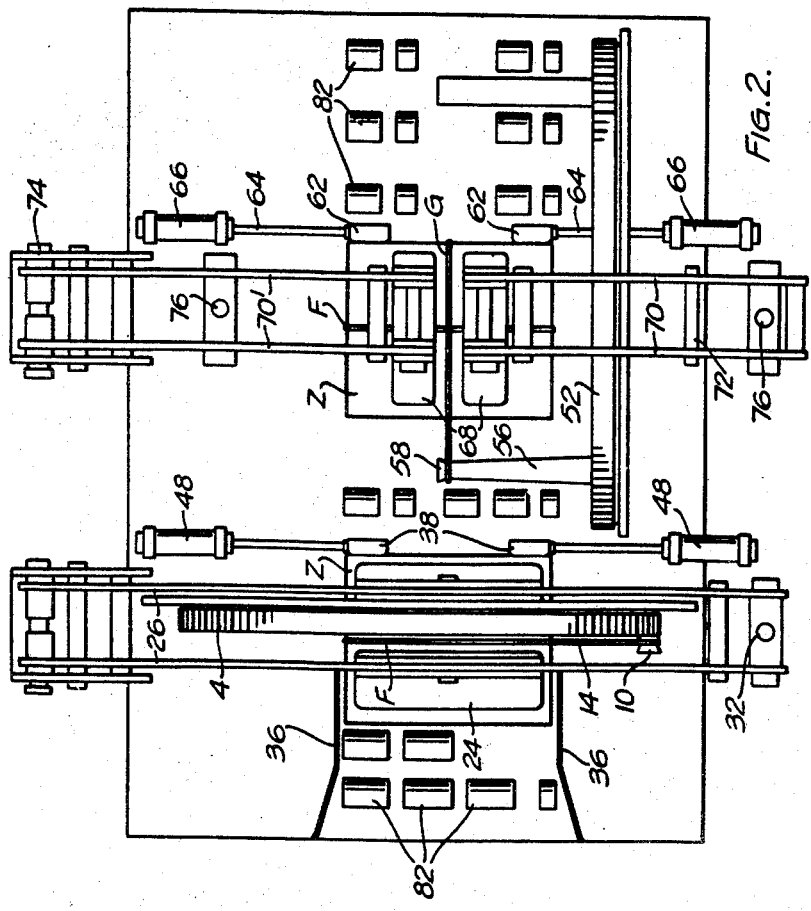
FIGURE 2 is a plan view of the apparatus with certain parts removed.

Referring to FIGURE 1, the apparatus comprises a main frame 1 carried by adjustable jacks 2. At the first tying station there is a rotatable annulus 4 mounted in circumferentially spaced rollers 6 which engage with the outer periphery of the annulus 4. These rollers are carried by the main frame 1 of the apparatus. The outer periphery of the annulus 4 is cut with gear teeth 8 which mesh with a driving gear, as will be described hereinafter. A twine retaining button 10 is carried by the annulus. This button is mounted on a spindle and spring biased against a plate 12 fixed to the annulus. Thus the free end 14 of a length of twine 16 from a supply 18, can be gripped between the button 10 and plate 12. It will thus be appreciated that upon rotation of the annulus 4, the button 10 is moved in a circular orbit carrying the twine with it so that a bundle placed within the annulus, as can be seen in FIGURE 2, has a length of twine wrapped around it.

A knotter mechanism 20 to be described in detail hereinafter, is located at the first tying station below the plane of the roller conveyors 22 which support the bundle and move it into the first tying station, onto the second tying station and then out of the apparatus. This knotter mechanism 20 ties the length or reach of twine which has been wrapped around the bundle and severs the tied reach from the twine leading back to the supply.

The bundle to be wrapped may comprise a stack of for example, newspapers, and with such a bundle it is usually very desirable and often necessary to compress and thus compact down the bundle whilst it is being tied. To this end two pressure plates 24 are provided at the first tying station, longitudinally spaced apart to lie one on either side of the string line of the first tying station. These plates 24 are pivotally attached to a pressure arm 26 which in turn is pivotally attached at one end 28 to the main frame 1 of the apparatus and at its other end 30 to a piston rod 32 slidable in a pneumatic cylinder 34. Thus by appropriately applying air pressure above or below the piston of the piston rod 32, the pressure plates 24 may be lifted or lowered.

At the entrance D to the apparatus, a pair of guide plates 36 are provided adjustably mounted on the main frame 1 so as correctly to locate a bundle centrally of the annulus 4 as said bundle is moved by the roller conveyor 22 into the first tying station. These guide plates 36 thus serve correctly to locate the bundle in the transverse direction. To locate the bundle in the longitudinal direction, a pair of abutment pillars 38 are provided (see FIGURE 7). These are slidably mounted in the transverse direction by top rollers 40 movable in guide ways 42 and bottom rollers 44 movable in guide ways 46. These abutment pillars 38 have to be movable into and out of the path of movement of a bundle from the first tying station to the second tying station; into said path of movement to arrest a bundle at the first tying station and out of said path of movement to allow free passage of the bundle onto the second tying station. This transverse movement of the abutment pillars 38 is achieved by the pneumatic cylinders 48 having piston rods 50 connected to the abutment pillars. As can be seen in FIGURE 7, the abutment pillars 38 are disposed vertically and the cylinders 48 are disposed horizontally. By appropriately applying air pressure to one or other sides of the pistons in the cylinders 48, so the abutment pillars 38 may be moved into and out of the path of movement of a bundle through the apparatus.

At the second tying station B there is provided a rotatable annulus 52 of basically the same construction as the annulus 4, mounted on the main frame 1 of the apparatus by circumferentially spaced rollers 54. The annulus 52 is disposed alongside and parallel to the path of movement of a bundle through the apparatus. An outrigger arm 56 extends from the annulus 52 parallel to its axis of rotation and when the said annulus 52 is in its normal position of rest, the outrigger arm 56 lies slightly below the plane of the roller conveyor 22. The free end of the outrigger arm carries twine retaining means in the form of a spring loaded button 58. The length of the outrigger arm is such that it terminates centrally of the width of the roller conveyor 22 and hence of the path of movement of the bundle. The button 58 serves the same function as does the button 10 of the annulus 4 at the first tying station, namely to engage and hold the free end of the length of twine coming from a supply (not shown). Thus upon rotating the annulus 52 through one revolution the button is caused once to move through a circular orbit encircling a bundle at the second tying station so that a length or reach of twine is wrapped around the bundle. A knotter mechanism 60 of the same construction as the knotter mechanism at the first tying station is provided at the second tying station below the roller conveyor 22. This knotter mechanism serves to tie the length or reach of twine wrapped around the bundle at the second tying station and to sever the tied length from the twine leading back to the supply.

As the bundle moves straight from the first tying station to the second tying station it is not necessary to provide means directly to locate the bundle in the transverse direction; this has previously been done by the guide plates 36 when the bundle first entered the apparatus. It is necessary, however, to locate the bundle at the second tying station with respect to the longitudinal direction. This is achieved by providing at the second tying station a pair of abutment pillars 62 (see FIGURE 2) of similar construction to the abutment pillars 38 of the first tying station. The abutment pillars 62 are attached to piston rods 64 extending from pneumatic cylinders 66. By the selective application of air pressure to the cylinders 66 it is possible to move the abutment pillars 62 into and out of the path of movement of a bundle. Thus by positioning the pillars 62 in the path of movement it is possible to arrest a bundle in the desired position at the second tying station and after the tying operation has been performed to move the pillars 62 out of the path of movement and so permit the bundle free passage from the second tying station.

As at the first tying station, so the second tying station is provided with means to compress and compact down a bundle whilst it is being tied. Such means comprises a pair of pressure plates 68 transversely spaced apart so as to be located one on either side of the string line of the second tying station. This can clearly be seen in FIGURE 2. These pressure plates are pivotally attached to pressure arms 70 and 70'. The pressure arm 70 is pivoted to the main frame 1 intermediate its ends as indicated at 72 in FIGURE 2 and the pressure arm 70' is pivoted at its end remote to that carrying one of the pressure plates 68 to the main frame of the apparatus, as indicated at 74. Each pressure arm is connected to a piston rod 76 of a pneumatic cylinder 78, so that by selectively applying air pressure to one or other side of the piston in the cylinder it is possible to lift or lower the pressure plates 68.

As can be seen in FIGURE 1, the roller conveyors 22 protrude from a top plate 80. Referring to FIGURES 3(a) and 3(b), this shows a plan of the apparatus immediately below this top plate 80. The roller conveyor comprises a plurality of individual rollers 82 keyed to shafts arranged in three groups indicated at 84, 86, and 88. There are four shafts in the group 84, five in the group 86 and six in the group 88. These shafts are rotatably mounted in the main frame 1 of the apparatus and each has a chain drive sprocket 90, 92 and 94 respectively according to groups. The chain sprockets 90 of the shafts 84 are entrained with two chain drives 96 (see FIGURE 5) engaging with drive sprockets 98 and 98'. The drive sprocket 98 is mounted on a stub axle 99 which carries an input drive sprocket 97. The drive sprocket 98' is mounted on an output shaft 128 (to be described later). An input drive sprocket 97' is fast on the output shaft 128. The two input drive sprockets 97 and 97' are coupled together by a chain 100 which rides over a tensioning sprocket 101. The shafts 84 provide the roller conveyor for the first tying station.

The sprockets 92 of the shafts 86 are entrained with a chain drive 102 passing over guide and tensioning rollers 104 and a drive roller 106. The sprockets 94 of the shafts 88 are entrained with a chain 108 which passes over guide and tensioning rollers 110 and a drive sprocket 112. The shafts 86 and 88 provide the roller conveyor for the second tying station.

Each tying station has its own driving means which are not mechanically coupled together but only electrically interconnected so that as the first tying operation at the first tying station is completed, the bundle is automatically moved to the second tying station and as soon as it arrives there, the second tying operation is commenced.

Referring to FIGURES 4(a) and 4(b), the drive for the first tying station includes an electric motor 114 (FIGURE 8) coupled through gearing 116 to a main drive shaft 118. This drive shaft 118 carries a bevel gear 120 meshing with a bevel gear 122 carried by a shaft 124. The two shafts 118 and 124 are always geared together so that in effect the shaft 124 forms an extension of the shaft 118 and it is only for convenience, minimising space requirements that it lies at right angles of the shaft 118. Mounted on the shaft 124 is a clutch 126 driving the output shaft 128. Thus when the clutch 126 is engaged, the shaft 128 is rotated, rotating the driving sprocket 98' and the input driving sprocket 97', which through the chain 100 drives the input driving sprocket 97 and this through the axle 99 turns the driving sprocket 98. Thus a drive is passed from the output shaft 128 through to the chains 96 and hence to the sprockets 90 of the shafts 84.

A clutch 130 on its input side is fast on the shaft 118 and on its output side with an annulus driving gear 132. This gear 132 is freely mounted on the shaft 118 and meshes with the annulus 4 of the first tying station. Thus when the clutch 130 is engaged, the gear 132 and hence the annulus 4 are coupled to the main driving shaft 118.

The clutch 130 is of the electro-magnetic type and is associated with an electro-magnetic brake 134.

A second electro-magnetic clutch 136 is mounted on the shaft 118 with its input coupled to the shaft and its output to a gear 138 meshing with a gear 140 carried by a shaft 142. This shaft 142 carries an electro-magnetic brake 144 and a bevel gear 148 meshing with a bevel gear 150 carried by a cam driving shaft 152. Thus when the clutch 136 is engaged, a drive is passed through the gears 138, 140, 148 and 150 to said cam drive shaft 152.

Through a pulley 154 and belt 156 a drive is taken from the cam drive shaft 152 to an oil pump 160 arranged to supply oil where required in the mechanism. Two cam discs 162 and 164 are fast on the cam drive shaft 152, the cam 162 has cam tracks in its two faces and as will be described, serves to operate a draw slide and twine knife, both forming part of the knotter mechanism and the cam 164 serves to operate the knotter mechanism. Three micro switch actuating cams 166 also are mounted on the cam drive shaft 152 and serve to operate micro switches 168.

With the drive means for the first driving station as hereinbefore described, when the machine is first switched on, the motor 114 rotates and a drive is passed to the shafts 118 and 124. When the roller conveyor 122 is required the clutch 126 is engaged; when the annulus 4 is required to rotate, then the clutch 130 is engaged and when the knotter mechanism is required to be operated then the clutch 136 is engaged. When the roller conveyor 22 is no longer required then the clutch 126 is simply disengaged and it is not necessary to provide any form of braking means. In the case of the annulus 4 and the knotter mechanism, it is desirable that when these two have finished their operations, this be performed as quickly as possible and to this end the electro-magnetic brakes 134 and 144 are provided.

The drive means for the second tying station is basically the same as that for the first tying station. At the second tying station the drive is provided by an electric motor 170 coupled to a gear 172 fast on a shaft 174. A gear 176 is carried by said shaft 174 and meshes with a gear 178 carried by a main drive shaft 180. A roller clutch 182 is mounted on the shaft 180 with its input coupled thereto. The output of the clutch 182 is taken to a sleeve 184, freely rotatable on said shaft 180. This sleeve 184 carries a chain sprocket 190 entrained with a chain 192 passing over a tensioner 194 and around a sprocket 198. The sprocket 198 is fast on a shaft 200 carrying a driving gear 202. As can be seen in FIGURE 6, this driving gear 202 meshes with an input driving gear 204 fast on an axle 206 which carries the driving sprockets 106 and 112 of the chain drives 102 and 110. Thus, a drive upon engagement with the clutch 182 is passed from the main drive shaft 180 to the chain drives 102 and 110 and hence to the roller shafts 86 and 88. An electro-magnetic clutch 206 is mounted on the shaft 180 with its input coupled thereto. The output of this clutch is coupled to a driving gear 208 for the annulus 52 of the second tying station. This driving gear 208 is freely rotatable on the shaft 180. The driving gear 208 is provided with an electro-magnetic brake 210. Thus upon engagement of the clutch, a drive is imparted to the annulus 52 and upon disengagement of the clutch and actuation of the brake 210, rotation of the annulus is stopped.

A second electro-magnetic clutch 212 is mounted on the shaft 180 with its input connected thereto. The output of this clutch 212 is to a driving gear 214 which is freely rotatable about the shaft 180 and meshes with a gear 216. The gear 216 is fast on a shaft 218 carrying an electro-magnetic brake 220 and a bevel gear 222. The bevel gear 222 is in engagement with a bevel gear 224 fast on a cam driving shaft 226.

Through a pulley 228 and belt 230 a drive is taken from the cam driving shaft 226 to an oil pump 232. Cam discs 234 and 236 are fast on the cam driving shaft 226 and as in the case with the cams 162 and 164 of the first tying station, these cam discs 234 and 236 serve to actuate the draw bar and twine knife, and knotter mechanism of the second tying station. Three micro switch actuating cams 238 are fast on the cam driving shaft 226 and serve to actuate micro switches 240.

The drive means of the second tying station is such that when the apparatus is stopped, the motor 170 rotates and a drive is imparted to the main drive shaft 180. From this drive shaft 180 a drive is taken as and when required through the clutch 182 to the roller conveyor 22; through the clutch 206 to the annulus 52; and through the clutch 212 to the knotter mechanism. As mentioned hereinbefore, when the drive to the roller conveyor 22 is disconnected there is no need instantaneously or rapidly to stop the conveyor and, therefore, no braking means is provided. It is, however, necessary rapidly to stop rotation of the annulus 52 and operation of the knotter mechanism and to this end the electro-magnetic brakes 210 and 220 are provided.

The knotter mechanism is illustrated in FIGURES 9, 10 and 11. The knotter mechanism includes a carriage 501 slidably mounted in the main frame 1 of the apparatus. In FIGURE 9 the carriage is shown in a position intermediate a forward operative position and a rearward inoperative position. At the front end 503 of the carriage a pair of knotter jaws 504, 505 are mounted for rotation about a common vertical axis 506. The jaws 504, 505 are attached to a shaft 507 which passes through the carriage 501 and carries, at its lower end, a bevel gear 508. This gear 508 meshes with a bevel gear 509 fast on a drive shaft 510. The lower jaw 505 is mounted on the shaft 507 for tilting movement about an axis 511 which is normal to the common axis 506 whereby the jaws 504, 505 may be caused to open and close. A cam follower 515, in the form of a roller is mounted on an extension 516 of the lower jaw 505 and rides in a cam track 517 defined by an inner cam surface 518 and an outer cam surface 519. These cam surfaces are fixed with respect to the jaws 504, 505 and are carried by the carriage 501. The inner cam surface 518 is formed with a nose 520, and the outer cam surface 519 is formed with a corresponding recess 521 so that, as the jaws rotate about their common axis 506 and the cam follower 515 moves around the cam track 517, the lower jaw 505 is caused to tilt to an open position when the cam follower 515 moves over the nose 520. The jaws 504, 505 rotate through one complete revolution during each knotting operation. They start and finish in a closed position and do not commence to open until they have rotated through approximately 180°.

A plunger 525 is slidably mounted in a bore 526 extending longitudinally through the carriage 501. The bore 526 at a forward end opens into cam tracks 517 and a head 527 of the plunger forms a continuation of the outer cam surface 519. The operative surface of the heads 527 is notched, as indicated at 528, and forms a continuation of the cam surface 519, said head, at one edge, also is chamfered as indicated at 529.

The plunger 525 at a rearward end 530 is formed with an extension 531 of reduced diameter and a compression coil spring 532 fits over this. The plunger 525 does not extend the full length of the bore 526 and the rearward end of the bore is closed by a plug or screw 533 which threadedly engages therewith. The coil spring 532 bears against the inner end of the screw 533 and hence is maintained under compression so as to bias the plunger 525 in a forward direction. Forward movement of the plunger 525 is limited by an abutment 534 so that when in its forward position the operative surface 528 of the head 527 forms a continuation of the outer cam surface 519.

The plunger 525 is formed with a recess 535 which at each end provides an abutment 536. This recess 535 is in alignment with a second bore 537 extending transversely through the carriage 501. A latch piece 538 (see FIGURE 11, of generally U-shape in section, is slidably mounted in said bore 537 and is provided with a nose 539 for engagement with the abutment surface 536. A compression coil spring 540 is housed in the bore 537 and biasses the latch piece 538 to the right, as shown in FIGURE 9, so that the nose 539 lies within the recess 535 which has a length slightly greater than the width of said nose. When the latch piece 538 is in this position the plunger 525 is locked against sliding movement in a rearward direction so that the operative surface 528 of the head 527 is maintained in a position wherein said surface 528 forms a continuation of the outer cam surface 519. Furthermore, sliding movement of the plunger in a forward direction under the bias of the spring 532 is limited by engagement of the abutment 534 with the nose 539. An end 541 of the latch piece 538 protrudes through the side of the carriage 1 and engages with a projection 542 of a release lever 543 which is pivotally attached at 544 to the carriage 501. Said release lever is provided with a cam surface 545 along one of its edges.

As previously mentioned the carriage 501 is mounted to the main frame 1 of the apparatus for sliding movement between a forward operative position and a rearward inoperative position. As the carriage moves back to its rearward position the cam surface 545 of the release lever 543 strikes a fixed abutment 546. The abutment 546 is in the form of a roller rotatably mounted on a block 547 having bolts 548, which pass through slots 549 in the frame 1. The relative position of the roller 546 can thereby be adjusted to control the timing of the unlocking of the plunger 525. As the release lever 545 strikes the roller 546 it pivots inwardly so that the projection 542 pushes the latch piece 538 to the left, as seen in FIGURES 9 and 11, against the bias of the spring 540, thereby moving the nose 539 out of the recess 535. The plunger is thus unlocked and is only held against sliding movement in a rearward direction by the bias of the coil spring 532. Thus, when the twine is stripped from the jaws 504, 505 the lower jaw 505 can tilt open against the bias of said spring 532.

Stripping of the twine from the jaws 504 and 505 is performed by a pair of stripper fingers 550, 551 pivotally attached respectively at 552, 553 to the support frame 1. A tension coil spring 554 is attached between the fingers 550, 551 so as to pull them together to bring their heads 555, 556 into engagement with the jaws 504, 505. This positioning of the fingers 550, 551 is shown in FIGURE 9. Each finger respectively is provided with an abutment 557, 558 arranged to engage with ears 559, 560, mounted on the carriage 501, as said carriage moves into its forward position.

With this arrangement, when the carriage is in its forward position, the abutment surfaces 557, 558 of the fingers 550, 551 are engaged by the ears 559, 560, so that said fingers are held apart out of the way of the jaws 504, 505. As the carriage 501 moves rearwardly, from its operative to its inoperative position, the ears 559, 560 also move rearwardly thereby allowing the fingers 550, 551 to move towards each other into engagement with the sides of the jaws 504, 505 so that the twine wrapped around the jaws is stripped therefrom and a knot completed.

The knotter jaws 504, 505 operate in known manner and during the knotting operation, said jaws rotate about their common axis 506 through 360°. The knotting operation is performed when the carriage 501 is in its forward operative position with the plunger 525 locked against rearward sliding movement. Upon completion of the rotation of the knotter jaws, the cam follower 515 is engaged by the head 527 of the plunger 525, and the lower jaw 505, is held closed.

The carriage 501 then moves rearwardly and simultaneously the stripper fingers 550, 551 move together into engagement with said jaws 504, 505 so that the knot is stripped therefrom and pulled tight. Not until this has been done does the cam surface 545 of the release lever 543 strike the roller 546. When this occurs, the release lever 543 pivots and pushes the latch piece 538 out of engagement with the plunger 525. The plunger is thus unlocked so that the twine lying between the jaws 504, 505 can be pulled therefrom. This occurs just before or simultaneously as the carriage 501 reached its rearward inoperative position. When the carriage moves to its forward operative position the foregoing sequence of events, so far as the actuation of the locking mechanism and its ancillary parts are concerned, occur in reverse.

As the knotter jaws 504, 505 complete their revolution to twist the sisal or twine into a knot, the cam follower 515 engages with the head 527 of the plunger 525 and snaps into the notch 528. This notch thus serves to centralize the knotter jaws after each revolution thereby ensuring that they always return to precisely the same angular position which is important so far as the transmission to rotate said jaws is concerned. The fact that the width of the nose 539 is less than the length of the recess 535 allows the plunger limited movement in a rearward direction to permit the cam follower 515 to ride over the chamfered edge 529. When the carriage 501 moves initially rearwardly from its forward position the jaws are locked closed and thus hold firmly onto the twine wrapped around a bundle and pull it tight. Next the stripper fingers push the loop of twine off the closed jaws and relatively towards the bundle thereby forming a taut wrap of twine around the bundle and a tight knot. Only when this has been done is the plunger released to permit the jaws to open and release the twine. The timing of this can be controlled very precisely by adjustment of the position of the roller 546.

During rotation of the jaws 504, 505 the cam follower 515 is prevented from flying radially outwardly due to centrifugal force, with respect to the comon axis 506, by the outer cam surface 519 and hence premature opening of the jaws is prevented. Furthermore, the cam follower 515 is moved radially inwardly as it moves off the nose 520 by the outer cam surface 519 so that positive control of the closing of the jaws is obtained. The opening and closing of the jaws is fully controlled so that there is no need to provide the lower jaw with a leaf spring biasing it to its closed position.

Movement of the carriage 501 between its operative and inoperative positions is through an arm 600 (See FIGURE 10), notched to engage with a stub 602 fixed on the carriage. This arm 600 is pivoted to the main frame of the apparatus and has a cam follower (not shown) engaging in a cam track in one surface of the cam disc 164. Thus during one rotation of the cam disc 164 the arm 160 is rocked back and forward once, so moving the carriage from its rearward inoperative position to its forward operative position.

The drive for the shaft 510 which rotates the knotter jaws is through a slidable rack 604 which engages with a pinion 606 when the carriage 501 is in its forward operative position. Engagement of the pinion 606 with the rack 604 as the carriage 501 moves into its operative position, is obtained by providing a fixed elongated rack segment 608. This segment 608 is engaged by the pinion 606 when the carriage is in its rearward inoperative position so that as the carriage 501 moves into its operative forward position the pinion 606 slides out of engagement with the fixed segment 608 and into engagement with the rack 604.

Vertical movement of the rack rotates the pinion 606 and hence the knotter jaws 504 and 505. Vertical reciprocating movement to the rack 604 is provided by a cam track in a surface of the cam disc 164. The contour of the cam track operating the rack 604 is such that the rack is lifted when the carriage 501 is in its forward operative position with the pinion 606 in engagement with said rack but the rack is not lowered until after the carriage 501 has been moved back sufficiently far to take the pinion 606 out of engagement with the rack 604 and back into engagement with the fixed segment 606.

The two cam tracks in the cam disc 164 which serve to move the carriage 501 forward into its operative position and back to its inoperative position and to rotate the knotter jaws 504 and 505 are such that the following sequence of events occurs:

The carriage is moved forward and held forward for a predetermined timed cycle.

Whilst the carriage is held in its forward position, the knotter jaws are given one rotation to tie a knot.

The carriage is then moved rearwardly into its inoperative position, the jaws being held in their forward pointing position shown in FIGURE 9.

Finally, the rack 604 is lowered after disengagement of the pinion 606.

To ensure that when the knotter jaws are actuated to tie a knot, they appropriately engage with the twine wrapped around the bundle, it is necessary to pull in against a vertical side of the bundle that portion of the twine running up from the supply and to lift up against the base of the bundle that portion of twine lying thereunder and running up to the free end of the twine held by the retaining button on the annulus. This is achieved by providing a draw slide 620 mounted in the main frame 1 of the apparatus for horizontal sliding movement. This draw slide 620 is provided with a hooked end so that when the draw slide is operated the hooked end engages with the twine and pulls it in against the side of the bundle and correctly positions the twine with respect to the knotter mechanism. The draw slide is former with a rack 622 engaged by a toothed segment 624 pivotally mounted to the main frame of the apparatus. Pivotal movement to the segment 624 is imparted through a push and pull rod 626, pivotally attached at one end to said segment and at its other end having a cam followed engaging with a cam track in one side face of the cam disc 162. The contour of said cam track is such that during one revolution of the disc 162 the draw slide is moved to pull the twine against the side of the bundle, to hold it there whilst the knot is tied and then the draw slide is moved back to its inoperative position as the carriage 501 is retracted to its rearward inoperative position.

The tip-up is in the form of an elongated bar 628 lying generally horizontal alongside the carriage 501 of the knotter mechanism. One end of the bar lies in the same vertical plane as the hooked end of the draw slide 620. This end of the bar is grooved to receive the twine. The bar at its other end is pivoted to the main frame of the apparatus and the under surface of the bar intermediate its ends is formed with a cam profile engaged by a stud 630 protruding from a side face of the carriage 501 of the knotter mechanism. Thus, when the carriage 501 moves into its forward operative position the stud 630 slides along the cam profile of the tip-up bar 628 and so pivots said bar to lift the grooved end. The twine lying underneath the bundle is thus engaged and lifted up against the bottom of the bundle.

A knife 632 is pivotally attached to the carirage 501 of the apparatus and is pivoted to cut the twine in the length thereof leading back from the tied knot to the supply. Pivotal movement of the knife is obtained through a push and pull rod having a cam follower engaging in a cam track in the other surface of the cam disc 162. The profile of the knife-operating cam track is such that the knife is moved to cut the twine as the carriage 501 moves back into its operative position and the tied knot is pulled tight.

Each tying station is provided with its own knotting mechanism and the mechanism at the second tying station is operated by the cams 234 and 236 in the same manner as the cams 162 and 164 operate the knotter mechanism on the first tying station.

The annuli 4 and 52 are rotated comparatively rapidly and, therefore, during rotation gain a certain amount of momentum. Each, therefore, at the end of its revolution, must be arrested and this is provided for by the electromagnetic brakes 134 and 210. Furthermore, each annulus must always be returned precisely to its normal position of rest so that it is positioned ready to commence a further cycle. This is obtained by providing each ring with a fixed sprag 640, that of the annulus 52 being shown in FIGURE 6. A spring biased locking pawl 642 is pivoted to the main frame 1 of the apparatus and a spring biased return lever 644 also is pivoted to the main frame of the apparatus. When the annulus 52 is in its correct position of rest the sprag 640 is held between the pawl 642 and return lever 644. In operation, the drive of the annulus is disconnected just before the annulus has completed its revolution and the electromagnetic brake actuated. As the annulus comes up to the completion of its rotation the sprag moves past the pawl 642 pushing it out of the way. When the sprag has moved past the pawl this, under its bias, moves into a position to engage behind the sprag 640. As the sprag moves beyond the pawl 642 it comes up against the return lever 644 and pushes it against its bias. The annulus over-rides, by a small amount, its normal position of rest and is then rotated back into its position of rest by the bias of the return lever 644.

The automation of the tying apparatus according to the present invention is obtained electrically, and the electrical circuit is in accordance with known practice namely, with apparatus such as the present tying apparatus, where a number of different mechanical functions have to be performed in sequence. Then, as one function is completed, so a micro-switch is tripped to set in motion the next function.

With the present tying apparatus the following functions are performed at each tying station:

(i) The bundle is moved by the roller conveyor 22 into the tying station.

(ii) The bundle is clamped by the pressure plates.

(iii) Twine is wrapped around the bundle.

(iv) The twine is knotted and severed.

(v) The abutment pillars locating the bundle longitudinally in the tying station are moved out of the way and the roller conveyor 22 actuated to move the bundle from the tying station, i.e., from the first tying station to the second tying station, or from the second tying station out of the apparatus.

(vi) The apparatus is reset to start a fresh tying cycle.

To obtain successive operation of the foregoing functions, micro-switches are appropriately located to be tripped by a bundle as it comes into the tying station; to be tripped by the pressure plates, or their operating mechanisms, as and when pressure has been applied to the bundle; to be tripped as and when the annulus completes its rotation, and to be tripped by the knotter mechanism, or its drive means, as and when knotting and severing of the twine is completed. The actual location of the micro-switches, the precise manner in which they function and the employment or otherwise of safety devices is chosen to suit particular requirements and does not, therefore, necessarily constitute an essential part of the present invention.

The full cycle of operations of the tying apparatus according to the present invention will now be described.

Each tying station is charged with twine, the twine being taken from a supply such as is indicated at 18 in FIGURE 1 and threaded through guide means and tensioning means of known form, and the free end of the twine engaged under the retainer buttons 10 and 58. The apparatus is then switched on so that the two main drive motors start to rotate and, if when the apparatus had been previously switched off, a full tying cycle has not been completed, then automatically the abutment pillars 38 and 62 are moved into their operative positions in the path of movement of a bundle through the apparatus. Furthermore, the roller conveyor 22 is rendered active so that the rollers are rotating. A bundle is then fed into the apparatus between the guide plates 36 and is taken up and moved into the first tying station by the roller conveyor 22. As the bundle comes into the tying station it trips a switch which disconnects the clutches 126 and 182 such that the roller conveyor 22 is rendered inoperative. The switch tripped by the bundle also actuates solenoid-operated air valves to supply air pressure to the cylinder 34 whereby the pressure plates 24 are drawn down to compress the bundle. When the bundle has been compressed, a switch is tripped to disengage the brake 134 and engage the clutch 130 such that drive is imparted to the annulus 4.

It should be noted that, if the bundle to be tied is not one that needs to be compacted down, then operation of the pressure plates through the air cylinder 34 may be cut out and the switch tripped by the bundle as it comes into its position in the first tying station may serve to disengage the brake 134 and engage the clutch 130.

As the annulus 4 comes up to the completion of its one revolution, micro-switches are tripped to disengage the clutch 130, to engage the brake 134, to disengage the brake 144, and to engage the clutch 136. Thus, the annulus is stopped, and through its positioning sprag (640), locking pawl (642) and return lever (644), correctly positioned in its position of rest, and simultaneously, as this occurs, the cam drive shaft 152 starts to rotate whereby the knotting operation, as hereinbefore described, is performed. As the knotting operation is completed, the micro-switches 168 are actuated by the cams 166 to disengage the clutch 136, to engage the brake 144, to engage the clutch 126, and to operate solenoid air valves to supply air to the cylinders 48. Thus, the drive to the knotter mechanism is disconnected, the roller conveyor 22 is engaged, and the abutment pillars 38 are withdrawn. The bundle now tied with a first tie F (see FIGURE 2) is advanced from the first tying station into the second tying station. After a predetermined time interval sufficient to allow the bundle to clear the abutment pillars 38, the air valves controlling the supply of air pressure to the cylinders 48 are operated so that air is supplied to said cylinders to move the abutment pillars 38 back into their operative positions, and so preparing the first tying station ready to receive the next bundle to be tied. As the bundle comes into its position for tying in the second tying station it trips a switch which causes the pressure plates 68 to descend, if such are required, or if they are not required, to cause rotation of the annulus 52. If the pressure plates 68 are used to compact the bundle then, after this has been done, a switch is tripped to cause rotation of the annulus 52. The switch tripped by the bundle as it comes into the second tying station thus disengages the clutch 182 and, if pressure plates 68 are not to be used, disengages the brake 210 and engages the clutch 206. As with the case of the annulus 4, so likewise the annulus 52, as it comes up to the completion of its revolution, causes micro-switches to be tripped to engage the brake 210, disengage the clutch 206, disengage the brake 220, and engage the clutch 212. The annulus 52 is thus arrested and drive imparted to the knotter mechanism of the second tying station. When the knotting operation at the second tying station has been completed, the micro-switches 240 are tripped through the operating cams 238 to engage the brake 220, disengage the clutch 212, engage the clutch 182 and actuate solenoid-operated air valves for the air cylinders 66. Thus, the bundle which has now been given a second tie G (FIGURE 2), is free to move from the second tying station and out of the apparatus, the abutment pillars 62 having been withdrawn and the roller conveyor 22 re-engaged.

After a predetermined time interval sufficient to allow the bundle to clear the abutment pillars 62, the air valves controlling the supply of air pressure to the cylinders 66 are operated so that the abutment pillars are returned to their operative position and the second tying station is prepared ready to receive the next bundle to be tied.

In the case of each annulus as it comes into its normal position of rest, the twine retaining button carried by the annulus engages with the length of twine running from the bundle back to the supply. With this arrangement, when the length of twine wrapped around the bundle has been tied, and severed from the supply, the newly formed free end of the twine is already in engagement with the retaining means and the annulus is thus fully prepared to commence the next tying cycle.

Although the roller conveyor 22 is divided into two main groups, that comprising the roller shafts 84 in the first tying station and the roller shafts 86 and 88 in the second tying station, each group having its own drive means through the clutches 126 and 182, it is envisaged that the conveyor would be operated as a whole and not as two groups. Thus, the two clutches 126 and 182 will always be engaged and disengaged simultaneously.

With the apparatus according to the present invention as hereinbefore described, the bundle has a straight line movement and is provided with two ties lying in planes at right angles to each other. Bearing in mind that the bundle may comprise a stack of newspapers, periodicals, books or other objects, this straight line movement is very important. If the bundle has to be turned through 90° to be given the two ties, or the path of movement of the bundle through the tying apparatus had a change of direction, there is a very positive risk that the bundle having been given one tie in being turned through 90°, or being caused to change direction, would twist such that the newspapers on the top of the stack would not be in register with the newspapers at the bottom of the stack. It thus follows that, by having the straight line movement as provided for by the present apparatus, a comparatively short tying cycle is possible because the bundle can be moved from one tying station to the other tying station comparatively rapidly without need to take excessive caution to prevent displacement of the component articles of the bundle.

What we claim is:

1. Tying apparatus comprising a first tying station and a second tying station, a straight line conveyor adapted to move a bundle to be tied to, and through, said first tying station and then to, and through, said second tying station, said first and second tying stations being spaced apart in the direction of movement of the bundle by said conveyor, and tying mechanism at each of said tying stations adapted to wrap and knot a length of twine around the bundle, one tying mechanism tying the bundle in a transverse direction and the other tying the bundle in a longitudinal direction, and means to control the feed of the bundle by the conveyor whereby it is maintained stationary at each tying station whilst a tying operation is being performed.

2. Tying apparatus including a first tying station and a second tying station and a straight line conveyor extending through said two tying stations, means to control actuation of said conveyor whereby it operates intermittently such that a bundle placed on the conveyor moves into said first tying station and remains stationary therein for a predetermined time, moves on to the second tying station and remains stationary therein for a predetermined time and then moves out and away from said second tying station, twine carrying means at said first tying station movable in an orbit in a plane normal to the path of movement of a bundle by the conveyor, twine knotting mechanism at said first tying station below the operative surface of said conveyor, twine carrying means at said second tying station movable in an orbit in a plane parallel to the path of movement of a bundle by the conveyor, said plane being adjacent the longitudinal axis of the conveyor, and twine knotting mechanism at said second tying station below the operative surface of said conveyor.

3. Tying apparatus according to claim 2 wherein each twine carrying means comprises a rotatable annulus and twine retaining means fast with the annulus and adapted to hold the free end of a length of twine, whereby upon rotation of the annulus the twine retaining means moves in a circular orbital path encircling a bundle at the respective tying station, drawing a length of twine from a supply and wrapping said length around the bundle.

4. Tying apparatus according to claim 3 wherein at said first tying station said rotatable annulus lies in a plane normal to the path of movement of a bundle on the conveyor, said bundle, when stationary at said station, lying within the annulus.

5. Tying apparatus according to claim 4 wherein at said second tying station said rotatable annulus lies in a plane parallel to and at one side of the path of movement of a bundle on said conveyor, said annulus having an outrigger arm parallel to its axis of rotation and carrying said twine retaining means.

6. Tying apparatus according to claim 3 wherein a movable abutment is provided at each of said tying stations, said abutment being movable between an operative position to arrest a bundle at said station and an inoperative position to allow free passage of said bundle from said station.

7. Twine tying apparatus including a conveyor comprising a plurality of rollers rotatable about parallel axes and imparting a straight line path of movement to a bundle placed on said conveyor, a first tying station and a second tying station spaced longitudinally of said conveyor, a rotatable annulus encircling said conveyor in a plane normal to the plane of the conveyor, said annulus being rotatable about an axis parallel to the longitudinal axis of said conveyor and spaced above the plane thereof, twine retaining means carried by said rotatable annulus, twine knotting mechanism located below the plane of said conveyor and adjacent the plane of said rotatable annulus, a rotatable annulus at said second tying station, said annulus lying in a plane normal to the plane of said conveyor and rotatable about an axis normal to said longitudinal axis of said conveyor and spaced above the plane thereof, an outrigger arm extending from said second mentioned rotatable annulus, twine retaining means fast on said outrigger arm, twine knotting mechanism at said second tying station below the plane of said conveyor and means to control actuation of said conveyor, whereby it is intermittently operated to move a bundle to, and through, said first tying station and to, and through, said second tying station.

8. Twine tying apparatus according to claim 7 including a movable abutment at each of said tying stations, said abutment being movable between an operative position to arrest a bundle at a station, and an inoperative position to allow free passage of the bundle from said station.

9. Twine tying apparatus according to claim 8 wherein means are provided adapted to control movement of said abutment at said first tying station into its operative position; rotation of said roller conveyor, whereby a bundle is moved into said first tying station; stopping said roller conveyor when said bundle is in position at said first tying station; rotation through one revolution of said annulus at said first tying station; actuation of said knotting mechanism at said first tying station; movement of said abutment at said first tying station to its inoperative position; actuation of the roller conveyor whereby said bundle is moved from said first tying station to said second tying station; movement of said abutment at said second tying station into its operative position; stopping said roller conveyor when said bundle reaches said second tying station; rotation of said annulus at said second tying station for one revolution; actuation of said knotting mechanism at said second tying station; movement of said abutment at said second tying station to its inoperative position; and rotation of said roller conveyor whereby said bundle, now tied, is moved out of said second tying station.

References Cited by the Examiner

UNITED STATES PATENTS 2,182,959 12/39 Bunn _____ 289—2

FOREIGN PATENTS 535,074 10/55 Italy.

DONALD W. PARKER, *Primary Examiner.*